3,076,306
SPINNING AND TWISTING SPINDLE
Rudolf Wagner, Winterthur, Switzerland, assignor to Rieter Machine Works Ltd., Winterthur, Switzerland, a corporation of Switzerland
Filed Apr. 21, 1961, Ser. No. 104,675
Claims priority, application Switzerland Apr. 29, 1960
3 Claims. (Cl. 57—135)

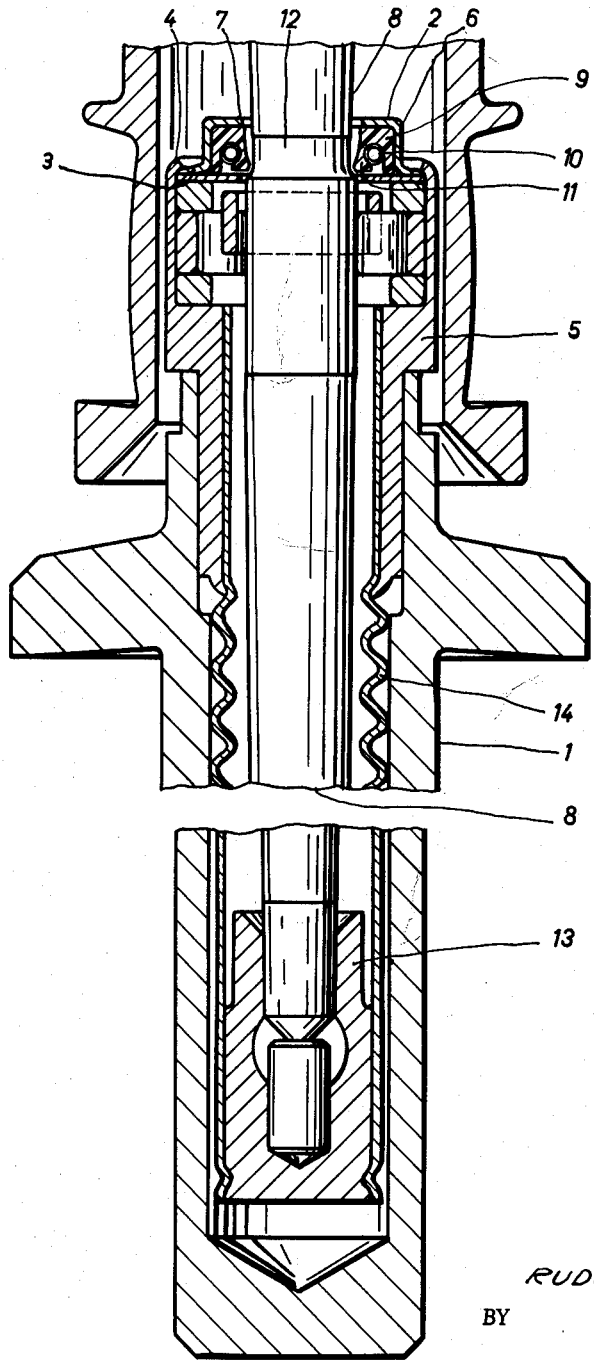

The present invention relates to a spindle for spinning and twisting machines.

The carefully hardened points of conventional spindles are subject to damage when they are carelessly inserted into the spindle case and pushed too hard into the footstep bearing.

An object of the invention is to provide a spinning or twisting spindle which prevents careless insertion of the spindle shaft into the spindle case and of the point of the shaft into the footstep bearing and avoids damage of vulnerable parts of the assembly. The spindle according to the invention includes means for providing an air cushion resisting too rapid insertion of the slightly tapered spindle shaft into a stationary tubular element in the lower end of which a footstep bearing is mounted and in the upper end of which a collar bearing for the spindle is mounted. The means for producing an air cushion preferably, but not exclusively, consists of an elastic ring mounted above the collar bearing coaxial of the spindle. The inner diameter of the ring relative to the diameter of the spindle shaft is such that when the shaft is pushed through the ring and the collar bearing towards the footstep bearing and about halfway in the tubular element, the ring forms a hermetic seal at the upper end of the tubular member, preventing escape of air therefrom. Upon continued pushing of the spindle shaft towards the footstep bearing the air in the tubular element is compressed and forms an air cushion resisting insertion of the spindle shaft and hard knocking of its point against the footstep bearing.

After the spindle shaft has reached its proper operating position, the air will gradually escape between the shaft and the inside of the elastic ring. To facilitate escape of the air, the spindle shaft may be provided with an annular recess which is opposite the elastic ring when the spindle is in the operating position and whose diameter is slightly smaller than the inside diameter of the ring so that there is a small annular clearance between the spindle and the ring, permitting escape of air when the device is in operating position.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

The FIGURE is a longitudinal sectional view of the lower part of a spindle assembly according to the invention.

Referring more particularly to the drawing, numeral 1 designates a spindle case whose top is closed by an annular member 2. The latter has an annular outer rim 3 extending radially of the spindle axis and retained by a bead 4 at the top of a casing 5 for an antifriction bearing for the collar of the spindle 8. The member 2 has a cylindrical portion 6 coaxial of the spindle axis and extending upward from the rim 3. An annular portion 7 extends in radial direction from the cylindrical portion 6 towards the spindle. An annular hollow rubber ring 9 having a substantially quadratic cross sectional configuration is fitted into the space formed by the portions 6 and 7 of the member 2 and the slightly conical spindle 8. The lower wall of the ring 9 has an annular slot affording radial movement of the side walls of the ring 9. The inner side wall 11 of the ring 9 is urged by a coil spring 10 towards the spindle 8. The latter is provided with an annular recess 12 opposite the ring 9 so that the ring 9 does not make contact with the spindle. The casing 5 for the collar bearing of the spindle has a sleeve portion fitted into the top of the case 1. Fitted into and rigidly connected to the sleeve portion is the top portion of a tubular element 14 whose lower end supports a footstep bearing 13.

Upon completion of insertion of about the lower half of the slightly tapered spindle shaft 8, which insertion is usually done quite quickly and carelessly, the ring 9 makes contact with the spindle so that the space within the tubular element 14 is hermetically sealed. Continued downward pushing of the spindle causes compression of the air in the element 14 since the air cannot work its way sufficiently fast alongside the spindle and past the ring 9 to the outside. The thus produced air cushion causes increasing resistance against fast downward movement of the spindle so that engagement of the bearing 13 is effected gently and damaging of the engaging parts is prevented. When the spindle is in the proper operating position the recess 12 permits escape of the air in upward direction. When the spindle shaft is pulled out, air flows from the outside into the element 14 and presses the inner wall 11 of the ring 9 outward so that a sufficiently large flow area is available for passage of the air.

While a specific embodiment of the invention has been shown and described, it will be apparent to those skilled in the art that various changes, modifications, substitutions, additions and omissions may be made therein without departing from the spirit and scope of the invention as set forth in the appended claims.

I claim:

1. A spinning and twisting spindle comprising a tubular means, a footstep bearing mounted in the lower end of said tubular means, a spindle collar bearing having a casing forming the upper end of said tubular means, a spindle having a shaft portion slightly tapered toward the lower end of said shaft portion and adapted to be inserted through said spindle collar bearing into said tubular means, and a yieldable annular means mounted coaxially of and above said spindle collar bearing to said casing for hermetically closing the interior of said tubular means towards the outside upon insertion of said shaft portion and affording compression of the air in said tubular means upon insertion of the spindle.

2. A spinning and twisting spindle as defined in claim 1 wherein said spindle is provided with an annular recess which is opposite said yieldable annular means when the spindle is in fully inserted position, said recess having a diameter smaller than the inner diameter of said annular means for providing, when the spindle is fully inserted, an annular clearance between said spindle and said annular means permitting escape of the air which has been compressed in said tubular means during insertion of the spindle.

3. A spinning and twisting spindle as defined in claim 1 wherein said annular means has a surface portion facing said spindle, a spring being associated with said annular means for urging said surface portion towards said spindle.

References Cited in the file of this patent

FOREIGN PATENTS 1,176,426    France _____ Nov. 24, 1958